United States Patent [19]

Krilanovich

[11] 4,229,740
[45] Oct. 21, 1980

[54] RADIO FREQUENCY SIGNAL DIRECTION FINDING SYSTEMS

[75] Inventor: Nicholas J. Krilanovich, Santa Barbara, Calif.

[73] Assignee: Raytheon Company, Lexington, Mass.

[21] Appl. No.: 966,172

[22] Filed: Dec. 4, 1978

[51] Int. Cl.³ ............................................. G01S 5/02
[52] U.S. Cl. ................................. 343/113 R; 343/853
[58] Field of Search ................ 343/100 LE, 853, 854, 343/113 R, 753

[56] References Cited

U.S. PATENT DOCUMENTS

| | | | |
|---|---|---|---|
| 3,911,442 | 10/1975 | Hatch | 343/854 |
| 3,979,754 | 9/1976 | Archer | 343/854 |

Primary Examiner—Eli Lieberman
Attorney, Agent, or Firm—Richard M. Sharkansky; Joseph D. Pannone

[57] ABSTRACT

A radio frequency signal direction finding system including a multi-beam antenna having a plurality of feed ports, each one of such feed ports receiving energy from the received signals, the levels of such energy being associated with the angles of arrival of such received signals. A plurality of high pass filters or differentiator circuits are coupled to the feed ports for producing output signals related to the changes in levels of the energy received at the feed ports. The output signals are used to determine the angles of arrival of the received signal. Because the angle of arrival of a received signal is determined by output signals representative of the changes in level of the signals received at the feed ports, the angle of arrival of a weaker received signal may be determined even if such weaker signal is received during a time period when a first, stronger, ongoing signal is being received from a different direction.

6 Claims, 11 Drawing Figures

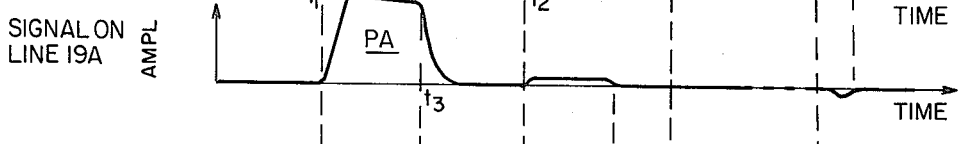
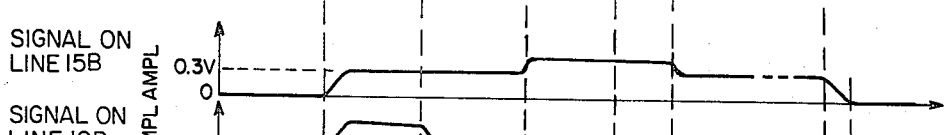
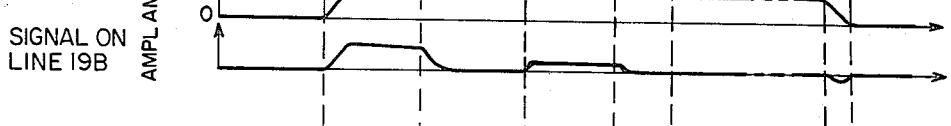
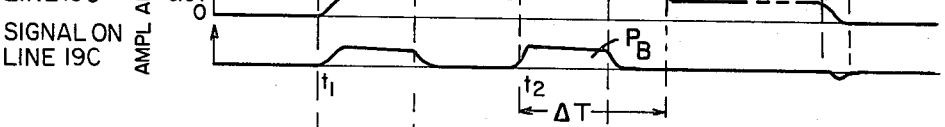
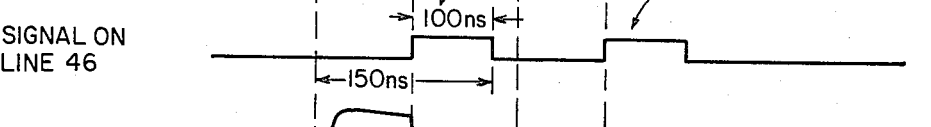
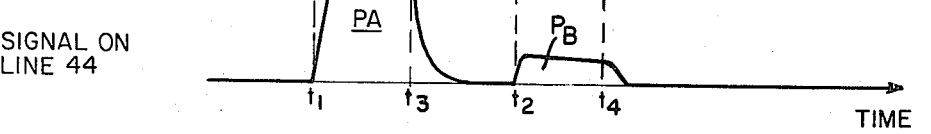

RADIO FREQUENCY SIGNAL DIRECTION FINDING SYSTEMS

The invention herein described was made in the course of, or under a contract or subcontract thereunder, with the Department of Defense.

BACKGROUND OF THE INVENTION

This invention relates generally to radio frequency signal direction finding systems and more particularly to apparatus used in such systems for determining the angle of arrival of a radio frequency signal using multi-beam radio frequency antennas when such signal is a weaker radio frequency signal received subsequent to reception of a stronger, on-going, radio frequency signal.

As is known in the art, it is often desirable to determine the direction or angle of arrival of a source of radio frequency signals. One technique used to determine such direction is through the use of a multi-beam array antenna. As is known, such array antenna may be designed so that it produces a plurality of simultaneously existing beams of radio frequency energy, each one of such beams having the gain and bandwidth of the entire antenna aperture. One such multi-beam array antenna is described in U.S. Pat. No. 3,761,936 issued Sept. 25, 1975, "Multi-beam Array Antenna," inventors Donald H. Archer, Robert J. Prickett and Curtis P. Hartwig, and assigned to the same assignee as the present invention. Such antenna includes an array of antenna elements coupled to a microwave lens through constrained electrical paths. A desired number of simultaneous beams may be obtained, the constrained electrical paths and the microwave lens equalizing the time delay of received energy between a given one of a number of feed ports and all points on a corresponding wavefront of the received energy. The relative levels of the energy received at the feed ports are related to the direction, or angle of arrival, of the source of the received radio frequency energy.

One technique used to determine the angle of arrival of the received radio frequency energy using a multi-beam array antenna of the type described above has been to pass the energy received at each of the feed ports through separate receiver channels, convert such received signals to digital words representative of the levels of the energy of the received signals and then digitally compute the angle of arrival of the received signal by comparing the relative digitized signals representative of the levels of the energy received at the feed ports. That is, because each feed port is associated with a particular angle of arrival, detection of the feed port which receives the greatest amount of energy provides, to a first approximation, a determination of the angle of arrival of the received signal. Interpolation techniques between the levels of the energy at adjacent feed ports provides a more accurate indication of the angle of arrival of the received energy.

While the technique described above is adequate in the determination of the angle of arrival of a single received signal, such technique may not be adequate where a signal is received subsequent to another, still on-going, received signal. For example, if a first, relatively strong signal is received the energy at a first feed port associated with the angle of arrival of such first received signal will be relatively large, while the energy at the remaining feed ports willl be relatively small. If a second, much weaker signal having a different angle of arrival is received while the first, stronger signal is still being received the level of the energy at the first feed port will remain relatively large compared to the energy received at the remaining feed ports, even the feed port associated with the angle of arrival of the second received signal. Consequently, with the technique described above the system will continue to indicate the angle of arrival of the first received, on-going signal when the second, weaker signal is received and the angle of arrival of the second, weaker signal will not be determined.

SUMMARY OF THE INVENTION

In accordance with the present invention a radio frequency direction finding system is provided including a multi-beam antenna having a plurality of feed ports, each one of such feed ports receiving energy from received signals, the levels of such energy being associated with the angles of arrival of such received signals; a plurality of filter means, each one coupled to a corresponding one of the feed ports, for producing an output signal related to the change in level of the energy received at the feed port coupled thereto; and means, responsive to the output signals of the filter means, for determining the angles of arrival of the received signals in accordance with the output signals.

With such arrangement, because the angle of arrival of a received signal is determined by output signals produced in response to changes in the levels of the energy received at the feed ports, such output signals are produced by a second signal received in the presence of a first, on-going received signal and hence the angle of arrival of such second signal is determined.

BRIEF DESCRIPTION OF THE DRAWINGS

The foregoing features of this invention, as well as the invention itself, may be more fully understood from the following detailed description read together with the accompanying drawings, in which:

FIGS. 2a–2h are time histories of various signals produced in the system shown in FIG. 1;

DESCRIPTION OF THE PREFERRED EMBODIMENTS

Figure 1:
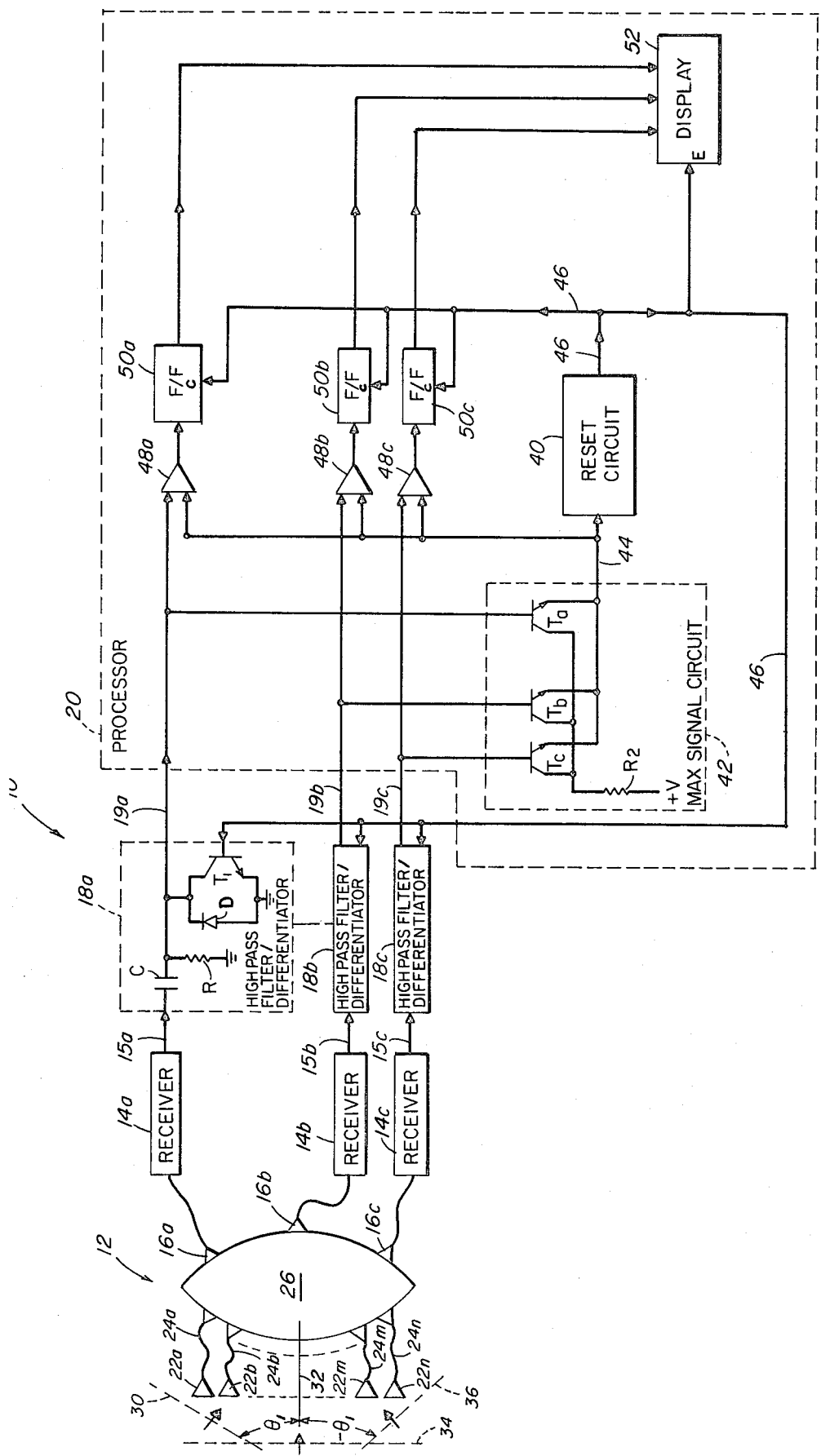
FIG. 1 is a block diagram of a radio frequency signal direction finding system according to the invention.

Referring now to FIG. 1, a radio frequency direction finding system 10 is shown to include: A multi-beam array antenna 12, here for simplicity adapted to provide three simultaneously existing beams of radio frequency energy, although it should be recognized that a greater number of beams would ordinarily be desirable; a plurality of receivers 14a–14c, each one coupled to a corresponding one of the three feed ports 16a–16c of the multi-beam array antenna 12; a plurality of high pass filters or differentiator circuits 18a–18c, each one coupled to a corresponding one of the receivers 14a–14c through lines 15a–15c, as shown; and a processor 20 coupled to the differentiator circuits 18a–18c through lines 19a–19c, as shown, for determining the angles of arrival of the radio frequency signals received by the multi-beam array antenna 12.

The multi-beam array antenna 12 includes a linear array of antenna elements 22a-22n, a radio frequency lens 26 and the plurality of feed ports 16a-16c, as shown. Such feed ports 16a-16c are disposed along an arc of best focus of the lens 26. As is known and described in U.S. Pat. No. 3,761,936 referred to above, the disposition of the antenna elements 22a-22n, the length of each one of the transmission lines 24a-26n and the configuration of the lens 26 are selected so that the electrical length of the paths from any one of the three feed ports 16a-16c to all points along a planar wavefront of radio frequency energy in any one of the three corresponding beams are the same. That is, the length of the electrical path from feed port 16c to planar wavefront 30 is the same for radio frequency energy entering any one of the antenna elements 22a-22n; the length of the electrical path from feed port 16b to any point on planar wavefront 34 is the same; and the electrical path from feed port 16a to any point on planar wavefront 36 is the same. It is noted that planar wavefront 30 is at an angle $\theta = \theta°_1$ with respect to the boresight axis 32 of the multi-beam array antenna 12; planar wavefront 34 is at an angle $\theta = 0°$ with respect to axis 32; and planar wavefront 36 is at an angle $\theta = -\theta°_1$ with respect to axis 32.

Considering first radio frequency energy in the beam represented by wavefront 30, it will be noted that portions of such energy fall successively on antenna elements 22a-22n and that each one of such succeeding portions will be guided through a different one of the transmission lines 24a-24n to the parallel plate lens 26. The spacing between successive antenna elements, the length of each transmission line and the shape of the parallel plate lens is such that each portion of the radio frequency energy in the beam represented by wavefront 30 is "in phase" at feedport 16c, while each portion of such energy arriving at feed ports 16a, 16b is "out of phase." That is, the vectorial addition of the "in phase" portions results in a maximum composite signal at feed port 16c and the vectorial addition of the "out of phase" portions results in composite signals at feed ports 16a, 16b which are substantially less, say in the order of 10 db down, than the maximum composite signal.

Similarly, portions of the radio frequency energy in the beam represented by wavefront 36, upon passing through antenna elements 22n-22a, transmission lines 24n-24a and the parallel plate lens 26 are "in phase" at feed ports 16a and "out of phase" at feedports 16b, 16c. Still similarly, portions of the radio frequency energy in the beam represented by wavefront 34 are "in phase" at feed port 16b and "out of phase" at feed ports 16a, 16c.

Referring now also to FIGS. 2a, 2c and 2e, the signals produced at the outputs of receivers 14a, 14b, 14c on lines 15a, 15b, 15c, respectively, in response to reception of a signal at time $t_1$, having an angle of arrival of $\theta = -\theta°_1$ (i.e. having the wavefront 36, FIG. 1) are shown. It is noted that if the level of the signal produced at the output of receiver 14a, on line 15a, is V volts then the levels of the signals produced by receivers 14b, 14c on lines 15b, 15c are here in the order of 0.32 V volts. Let it now be considered that a second, weaker pulsed signal, say 6 db less in amplitude than the level of the first received signal, is received at a time $t_2$ during which the first received signal is still present. Further, let the second signal have an angle of arrival of $\theta = \theta°_1$, (i.e., having the wavefront 30, FIG. 1). It follows then that a short time after the time $t_2$ the level of the signal produced by receiver 14c on line 15c will increase by 0.5 V volts from 0.32 V volts to 0.82 V volts. Likewise, the level of the signal on line 15a will increase in the order of 0.15 V volts from V volts to 1.15 V volts and the level of the signal on line 14b will increase in the order of 0.15 V volts from 0.32 V volts to 0.47 V volts. It is noted then that when the first and second signals are both being received (i.e. during the time interval $\Delta T$) a comparison of the relative voltages on lines 15a-15c would incorrectly indicate the angle of arrival of the later received signal since line 15 continues to produce the larger signal.

Referring again to FIG. 1, each one of the high pass filters or differentiator circuits 18a-18c is identical in construction. An exemplary one thereof, here differentiator circuit 18a, is shown to include a resistor R and a capacitor C arranged as a differentiator, the capacitor C having one electrode connected to line 15a and the other electrode connected to ground through resistor R and to line 19a, as shown. Also connected between line 19a and ground is a diode D and a transistor $T_1$ having its emitter and collector electrodes connected in parallel with the diode D between line 19a and ground as shown. The base electrode of transistor $T_1$ is connected to a reset network 40 of processor 20 via line 46, as shown. The resistor R and capacitor C are arranged as shown to produce a signal on line 19a which is substantially proportional to the amount of change in level of the voltage on line 15a. It is noted that the value of the capacitor C is relatively small, here in the order of 200 PF, to enable very rapid reset. The value of the resistor R is, however, relatively large so that the capacitor does not discharge significantly for about, here, 50 ns.

Referring now also to FIGS. 2b, 2d and 2f, the signals produced on lines 19a, 19b and 19c in response to the received signals are shown. As shown at time $t_1$, a relatively large level pulse is produced on line 19a and relatively smaller level pulses are produced at time $t_1$ on lines 19b and 19c (because a relatively large change in signal level has occurred on line 15a as compared with the signal level changes on lines 15b and 15c), whereas at time $T_2$ a relatively large amplitude pulse is produced on line 19c as compared with the pulses produced at time $t_2$ on lines 19a and 19b (because a relatively larger change in signal level has occurred in response to the second received signal on line 15c than on lines 15a and 15b even though the signal level on line 15a is still the largest). As shown in FIG. 1, the lines 19a, 19b and 19c are fed to a maximum signal circuit 42 which produces an output signal on line 44 which has an amplitude level equal to the largest level of the signals on lines 19a, 19b and 19c at any instant in time. The signal produced at the output of the maximum signal circuit 42 is shown in FIG. 2h. Such signal is comprised of two pulses, one a relatively large pulse produced at time $t_1$ (i.e. the pulse produced in line 19a in response to the signal received at time $t_1$) and a smaller pulse produced at time $t_2$ (i.e. the pulse produced on line 19c in response to the signal received at time $t_2$).

The maximum signal circuit 42 includes three transistors $T_a$, $T_b$, $T_c$ havng base electrodes connected to lines 19a, 19b and 19c, respectively, as shown. The collector electrodes of such transistors $T_a$, $T_b$, $T_c$ are connected together and through a resistor $R_2$ to a suitable voltage source +V, as shown. The emitter electrodes of such transistors are connected together and to line 44, as shown. It follows then that in response to the pulse produced at time $t_1$ on line 19a only transistor $T_a$ will have sufficient forward bias between the base and emitter electrodes to conduct, or turn on (transistors $T_b$ and $T_c$ being off), so that the pulse on line 19a becomes coupled to line 44. However, at time $t_2$ the pulse produced on line 19c will provide sufficient forward bias to the base and emitter electrodes of transistor $T_c$ so that only transistor $T_c$ will turn on and the pulse produced on line 19c at time $t_2$ will couple to line 44 as shown in FIG. 2h.

The pulses produced on line 44 are fed to a reset circuit 40, here a one shot multivibrator, which, in response to a pulse on line 44, produces a pulse on line 46. The pulse produced on line 46 is shown in FIG. 2g, such pulse having a relatively high level for here in the order of 100 ns, which high level commences in the order of 50 ns after the pulse on line 44 is produced. Hence, here a first pulse $P_1$ is produced 50 ns after the time $t_1$ (i.e. at time $t_3$) and a second pulse $P_2$ is produced 50 ns after the time $t_2$ (i.e. at time $t_4$). The pulses produced on line 46 are fed to the base electrodes of transistors $T_1$ of the differentiator circuits 18a–18c as shown in FIG. 1. Such pulses $P_1$, $P_2$ turn on the transistor $T_1$ to enable the capacitor C to rapidly discharge through the transistor $T_1$ to zero volts or ground so that the system is ready to accurately measure, from a zero reference, the next received signal. That is, in response to pulse $P_1$ at time $t_3$ the capacitor C is discharged to zero volts as shown in FIGS. 2b, 2d, 2f and the voltage on lines 19a, 19b, 19c decay rapidly to zero volts despite the presence of signals on lines 15a, 15b, 15c. Likewise, in response to the pulse $P_2$ at time $t_4$ the signals on lines 19a, 19b, 19c rapidly decay to zero volts despite the presence of a signal on lines 15a, 15b, 15c as shown in FIGS. 2b, 2d and 2f.

Referring now again to FIG. 1, the signal on line 44 is fed to a plurality of comparators 48a, 48b, 48c, as shown. As shown in FIGS. 2a–2f, it is noted that during the time interval between $t_1$ and a time somewhat greater than $t_3$ the largest signal on lines 19a, 19b and 19c is the signal on line 19a since the voltage level change on line 15a is greater than the voltage level changes on lines 15b and 15c. Likewise, at a time interval between time $t_2$ and a time somewhat greater than $t_4$ the largest signal on lines 19a, 19b and 19c is the signal on line 19c because the voltage level change on line 15c is, during this time interval, greater than the voltage level changes on line 15a and 15b. It follows then that, as shown during the time interval between time $t_1$ and a time somewhat larger than the time $t_3$ the pulse $P_A$ (FIG. 2b) produced at the output of differentiator circuit 18a on line 19a is coupled to line 44 (as shown in FIG. 2h) and that during the time interval between the time $t_2$ and a time somewhat larger than the time $t_4$ the pulse $P_B$ (FIG. 2f) produced at the output of differentiator circuit 18c on line 19c is coupled to line 44 (as shown in FIG. 2h).

Comparator 48a is also fed by the signal on line 19a, comparator 48b is also fed by the signal on line 19b and comparator 48c is also fed by the signal on line 19c, as shown. Comparators 48a, 48b, 48c are of any conventional design and produce a "high" or logical 1 signal when the level of one signal fed thereto is greater than the level of the other signal fed thereto and produce a "low" or logical 0 signal when the opposite is true. In particular, when the level of the signal on line 19a is greater than or equal to the level of the signal on line 44 a logical 1 is produced at the output of comparator 48a, whereas if the signal on line 19a is less than the signal on line 44, a logical 0 is produced at the output of comparator 48a. Similarly, if the signal on line 19b is greater than or equal to the level of the signal on line 44, a logical 1 is produced at the output of comparator 48b and when the level of the signal on line 19b is less than the level of the signal on line 44 a logical 0 is produced by comparator 48b. Still similarly, when the level of the signal on line 19c is greater than or equal to the level of the signal on line 44 a logical 1 is produced at the output of comparator 48c and when the level of the signal on line 19a is less than the level of the signal on line 44 a logical 0 is produced at the output of comparator 48c.

In operation, and referring to FIGS. 2b, 2d, 2f and 2h, when pulse $P_A$ is produced such pulse passes to comparator 48a via both lines 19a and 44; hence such comparator 48a produces a logical 1. During such time such pulse $P_A$ is produced; however, the signal on line 44 is greater than the signals on lines 19b and 19c; hence during such time comparators 48b, 48c produce logical 0 signals. When pulse $P_B$ is produced such pulse passes to comparator 48c via both lines 19c and 44; hence such comparator 48c produces a logical 1. During such time pulse $P_B$ is produced; however, the signal on line 44 is greater than the signals on lines 19a and 19b; hence during such time comparators 48a, 48b produce logical 0 signals.

The outputs of comparators 48a, 48b 48c are fed to flip/flops 50a, 50b, 50c, respectively, as shown. The logic signals fed to such flip/flops 50a, 50b, 50c from such comparators 48a, 48b, 48c are clocked into such flip/flops in response to the pulses on line 46, such line 46 being fed to the clock terminal c of such flip/flops. The pulses $P_A$, $P_B$ on lines 46 are also fed to the enable terminal E of a display 52. Also fed to the display 52 are the outputs of the flip/flops 50a, 50b, 50c. Hence, in response to each pulse on line 44 the display 52 will display a three bit digital word indicative of the angle of arrival of each of the two received signals. The first three bit digital word will be produced in response to pulse $P_A$ and the second will be produced in response to pulse $P_B$. Therefore, in response to the pulse $P_A$ the three bit digital word displayed is the digital word made up of the logical signals stored in flip/flops 50a, 50b, 50c, respectively, that is, 100, indicating reception of a signal at angle of arrival $-\theta_1$ and in response to pulse $P_B$ the three bit word displayed is 001 indicating reception of a signal at an angle of arrival $\theta_1$.

Figure 3:
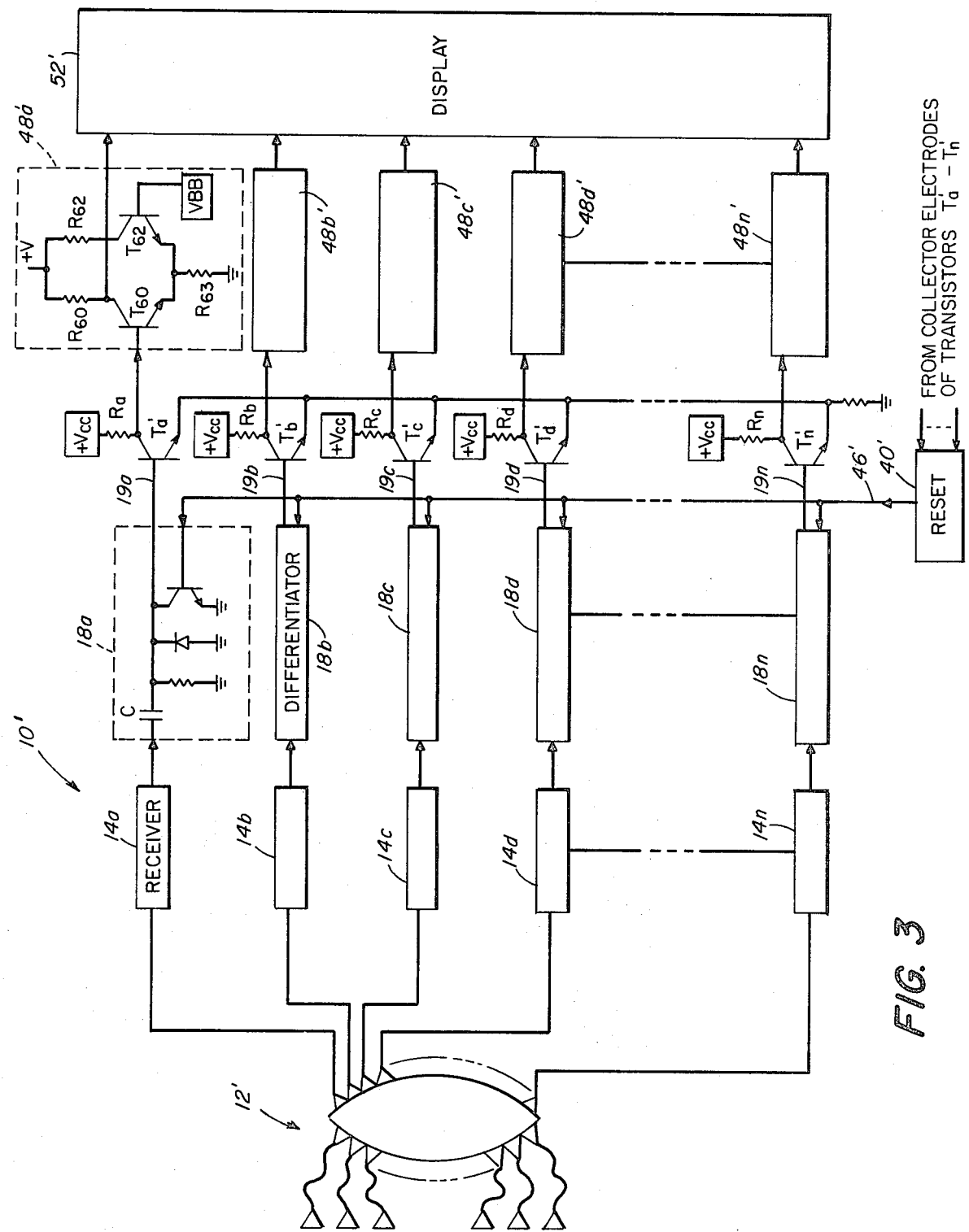
FIG. 3 is a block diagram of an alternative embodiment of a radio frequency signal direction finding system according to the invention.

Referring now to FIG. 3 a radio frequency energy direction finding apparatus 10' is shown. Such apparatus 10' includes a multibeam array antenna 12' similar to the antenna 12 shown in FIG. 1 except here n feed ports 16a–16n and hence n receivers 14a–14n and n differentiator circuits 18a–18n are provided, as shown. Here n lines 19a–19n are fed to the base electrodes of transistors $T_a'$–$T_n'$, respectively, as shown. The emitter electrodes of such transistors $T_a'$–$T_n'$ are connected together and to ground through a resistor, as shown. The collector electrodes of such transistors are connected to a $+V_{cc}$ volt supply through resistors $R_a$–$R_n$, respectively, as shown, and to differential logic switches 48a'—48n', respectively, as shown.

The differential logic switches 48a'–48n' are identical in construction. An exemplary one thereof, here differential logic switch 48a', includes a pair of transistors $T_{60}$, $T_{62}$, the base electrode of transistor $T_{60}$ being connected to the collector electrode of transistor $T_a'$, the base electrode of transistor $T_{62}$ being connected to a reference voltage source $V_{bb}$, the collector electrodes of transistors $T_{60}$, $T_{62}$ being connected to a $+V_{cc}$ supply through a pair of resistors $R_{60}$, $R_{62}$, respectively, as shown, and the emitter electrodes of such transistors being connected to ground through resistor $R_{63}$, as shown.

In operation, the presence of pulses on lines $19a$-$19n$ will turn on only that one of the transistors $T_a'$-$T_n'$ which has the largest voltage level. The pulse with the largest voltage level on lines $19a$-$19n$ will be the one coupled to the feed port of multibeam antenna $12'$, experiencing the greatest change in level as discussed in connection with FIG. 1. That is, the feedport receiving a newly received signal even if such signal is received during reception of a previously received stronger signal. When such one of the transistor $T_a'$-$T_n'$ turns on the collector electrode thereof goes from a "high" positive voltage to ground, thereby turning off transistor $T_{60}$, turning on transistor $T_{62}$ and producing a high or logic 1 signal at the collector electrode of transistor $T_{60}$. The collector electrodes of transistors $T_{60}$ are fed to a display $52'$ and in response to each new received signal the display changes and produces an n bit digital word representative of the angle of arrival of each newly received signal. When any one of the voltages at the collector electrodes changes, indicating the reception of a new signal, reset circuit $40'$, here a one shot multivibrator similar to the reset circuit 40 (FIG. 1), is activated to produce a pulse on line $46'$ to discharge capacitor C in the differentiator circuits $18a$-$18n$ as in the circuit shown and described in FIG. 1.

Figure 4:
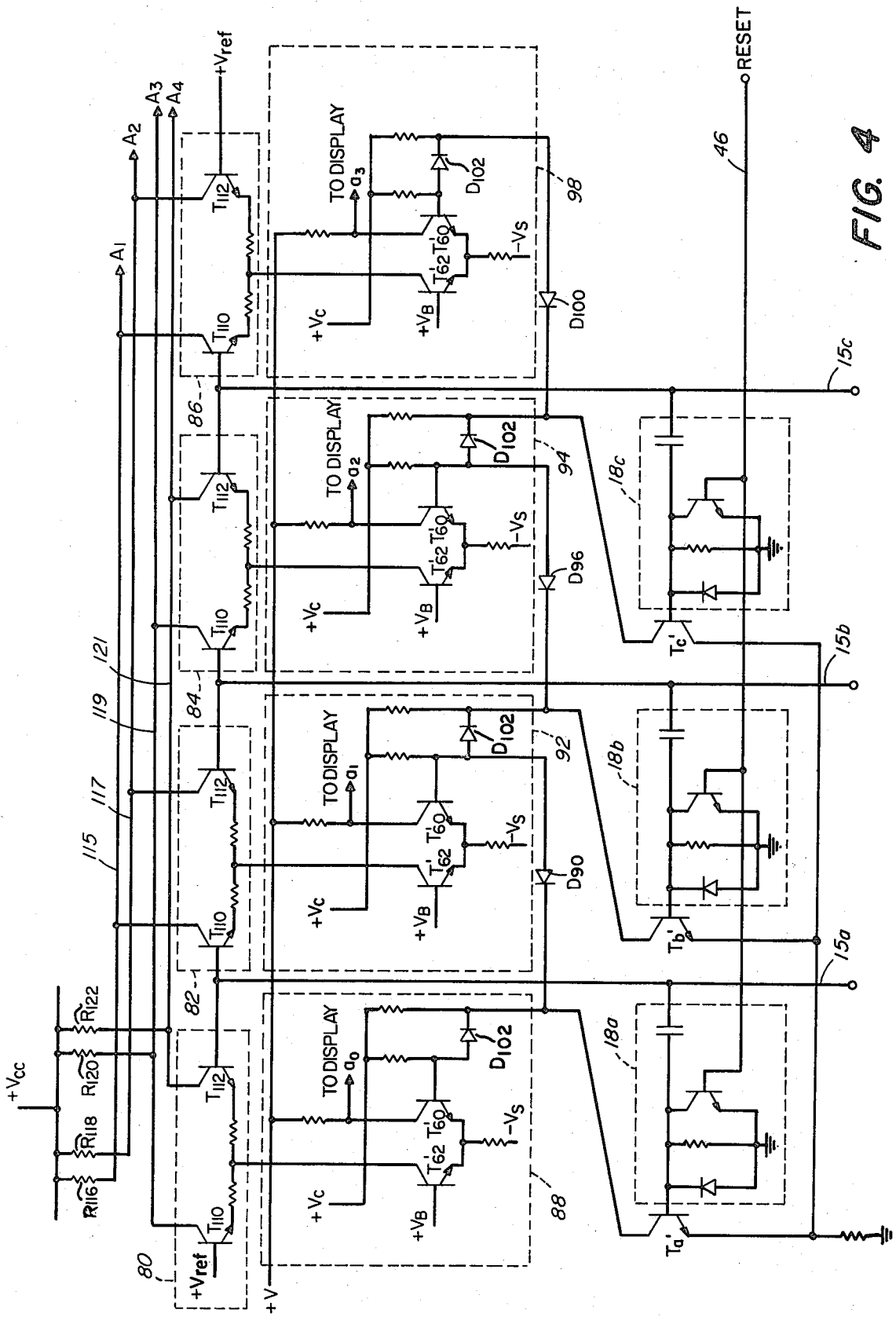
FIG. 4 is a schematic diagram of an alternative embodiment of processing apparatus adapted for use with a multi-beam antenna used in the system shown in FIG. 1.

Referring now to FIG. 4, an alternative arrangement is shown for determining the angles of arrival of received signals. Here the signals produced by the receivers $14a$, $14b$, $14c$ (FIG. 1) on lines $15a$, $15b$ and $15c$, respectively, are fed to: (a) high pass filters or differentiator circuits $18a$, $18b$ and $18c$, respectively, as shown; and (b) to pairs of differential amplifiers 80, 82; 82, 84; 84, 86, respectively, as shown. The output signals representative of the change in level of the signals fed to lines $15a$, $15b$ and $15c$ are produced, as described in connection with FIG. 1, by differentiators $18a$, $18b$ and $18c$ respectively, as shown. Such output signals are fed to the base electrodes of transistors $T_a'$, $T_b'$ and $T_c'$, respectively, as shown. The emitter electrodes of transistors $T_a'$, $T_b'$ and $T_c'$ are connected together and then to ground through a suitable load, as shown. As discussed in connection with FIG. 3, only the transistor having the largest base voltage will turn on. That is, only that one of the transistors $T_a'$, $T_b'$, $T_c'$ which is driven by the greatest output signal level produced by the differentiator circuits $18a$, $18b$ and $18c$ will turn on and conduct. Hence, referring also to FIG. 2, in response to the pulse $P_A$ received at time $t_1$, the transistor $T_a'$ will turn on and will turn off in response to a reset signal fed to line 46. Then, in response to the second pulse $P_B$ at time $t_2$, transistor $T_c'$ will turn on and such transistor $T_c'$ will turn off in response to the reset signal fed to line 46.

The collector electrode of transistor $T_a'$ is connected to a differential switching circuit 88 and through a diode $D_{90}$ to a differential switching circuit 92, as shown. Similarly, the collector electrode of transistor $T_b'$ is connected to the differential switching circuit 92 and to differential switching circuit 94 through a diode $D_{96}$, as shown. Still similarly, the collector electrode of transistor $T_c'$ is connected to the differential switching circuit 94 and to a differential switching circuit 98 through a diode $D_{100}$, as shown. It is first noted that the differential switching circuits 88, 92, 94, 98 are similar to the differential switching circuits $48a'$-$48n'$ shown in FIG. 3. In particular, each one of the circuits 88, 92, 94, 98 includes a pair of transistors $T_{62}'$, $T_{60}'$. The base electrodes of transistors $T_{62}'$ are connected to a suitable reference voltage source $V_B$. The emitter electrodes of such transistors $T_{62}'$, $T_{60}'$ are connected together and then to a $-V_S$ supply through a suitable resistor, not numbered. The base electrodes of transistors $T_{60}'$ of circuits 88, 92, 94 are connected to the collector electrodes of transistors $T_a'$, $T_b'$ and $T_c'$ respectively through diodes $D_{102}$, as shown, and to a $+V_c$ volt supply through resistor (not numbered), as shown.

In operation, in the absence of a received signal the transistors $T_a'$, $T_b'$ and $T_c'$ are off so that the collector electrodes of such transistors are at a high positive voltage. The base electrodes of transistors $T_{60}'$ of each of the differential switching circuits 88, 92, 94, 98 are also at a high positive voltage such that transistors $T_{60}'$ conduct while transistors $T_{62}'$ do not conduct. When transistors $T_{60}'$ conduct the voltages at the collector electrodes thereof go "low" and hence logical 0's are produced on output lines $a_0$, $a_1$, $a_2$ and $a_3$. Consider first a condition when transistor $T_a'$ conducts indicating the reception of a signal having an angle of arrival of $\theta = -\theta°$ (FIG. 1). In response to such signal the collector electrode of transistor $T_a'$ goes low, diodes $D_{102}$ and $D_{90}$ both conduct and transistors $T_{60}'$ of both differential switching circuit 88 and circuit 92 go off, raising the collector electrode voltages of such transistors $T_{60}'$ of such circuits 88, 92. Consequently, the logical signals produced on lines $a_0$, $a_1$, $a_2$, $a_3$ are 1, 1, 0, 0, respectively. Similarly, when the transistor $T_b'$ turns on in response to a signal being received having an angle of arrival of $\theta = 0°$ the logical signals on lines $a_0$, $a_1$, $a_2$, $a_3$ will be 0, 1, 1, 0. Still similarly, when a signal is received having an angle of arrival of $\theta = \theta_1°$ the logical signals on lines $a_0$, $a_1$, $a_2$, $a_3$ are 0, 0, 1, 1. It follows then that the angle of arrival of the received signal may, to a first approximation, be determined by the logical signals on lines $a_0$, $a_1$, $a_2$ and $a_3$, as follows:

| $\theta$ | $a_0$ | $a_1$ | $a_2$ | $a_3$ |
|---|---|---|---|---|
| $-\theta°$ | 1 | 1 | 0 | 0 |
| $0°$ | 0 | 1 | 1 | 0 |
| $\theta°$ | 0 | 0 | 1 | 1 |

Referring again to FIG. 4 it is noted that the collector electrode of transistor $T_{62}'$ of differential switching circuit 88 is connected to differential amplifier 80, as shown. Similarly, the collector electrode of transistor $T_{62}'$ of differential switching circuit 92 is connected to differential amplifier 82; the collector electrode of transistor $T_{62}'$ of circuit 94 is connected to differential amplifier 84; and the collector electrode of transistor $T_{62}'$ of circuit 98 is connected to the differential amplifier 86, as shown.

Each one of the differential amplifiers is identical in construction and includes a pair of transistors $T_{110}$, $T_{112}$, as shown. The emitter electrodes of transistors $T_{110}$, $T_{112}$ are connected together through resistors, as shown, to the collector electrode of transistor $T_{62}'$. It follows then that such transistors $T_{110}$, $T_{112}$ do not conduct unless transistor $T_{62}'$ is turned on. As discussed above, transistor $T_{62}'$ of circuits 88 and 92 will turn on when transistor $T_a'$ is turned on, thereby enabling transistors $T_{110}$, $T_{112}$ of differential amplifiers 80, 82 to conduct. Hence, when transistor $T_a'$ turns on in response to a new signal producing a large change in signal level on line 15a a pair of differential amplifiers, in particular differential amplifiers 80, 82, are enabled. Similarly, when transistor $T_b'$ is turned on in response to a large change in signal level on line 15b differential amplifiers 82 and 84 are enabled. Still similarly, when transistor $T_c'$ is turned on in response to a large change in signal level on line 15c differential amplifiers 84 and 86 are both enabled.

When any one of the differential amplifiers 80, 82, 84, 86 is enabled as described above current will flow from the $+V_{cc}$ source to the collector electrodes of transistors $T_{110}$, $T_{112}$ in such amplifier. The difference in current flow in the collector electrodes is proportional to the difference in voltages at the base electrodes of transistors $T_{110}$, $T_{112}$. Therefore, consider that a newly received signal has an angle of arrival between 0° and $-\theta_1°$ but somewhat closer to 0°. Hence, in response to such signal a relatively larger change in signal level is produced on line 15b than on lines 15a and 15c and voltages continue to be produced on lines 15a, 15b and 15c for the duration of the received signal. Further, the signal level on line 15a will be greater than the signal level on line 15c. In response to the large change in voltage level on line 15b transistor $T_b'$ turns off, thereby enabling differential amplifiers 82 and 84 as described above. The difference in current flow in the collector electrodes of transistors $T_{110}$ and $T_{112}$ of differential amplifier 84 will be proportional to the difference in signal level on lines 15b and 15c. Similarly, the difference in current flow in the collector electrodes of transistors $T_{110}$ and $T_{112}$ of differential amplifier 82 will be proportional to the difference in signal level on lines 15a and 15b. A voltage $A_1$ on line 115 is produced across resistor $R_{116}$ which is proportional to the current in the collector electrodes of transistor $T_{110}$ of differential amplifiers 82, 86. A voltage, $A_2$, proportional to the amount of current flow in the collector electrodes of transistor $T_{112}$ of differential amplifier 82, 86 is produced across resistor $R_{118}$ and appears on line 117. A voltage $A_3$ produced on line 119 across resistor $R_{120}$ is proportional to the amount of current flow in the collector electrodes of transistors $T_{110}$ of differential amplifiers 80, 84 and a voltage $A_4$ produced on line 121 across resistor $R_{122}$ is proportional to the amount of current flow in the collector electrodes of transistor $T_{112}$ of differential amplifiers 80, 84. It follows then in the example above that the voltage difference $(A_1-A_2)$ will be much less than the voltage difference $(A_3-A_4)$, thereby indicating that the angle of arrival of the received signal is between 0° and $-\theta°$ rather than between 0° and $+\theta°$. The voltage difference $(A_1-A_2)$ will then be related to the angular deviation of the received signal from the boresight axis of the multibeam array antenna 12 (FIG. 1). This enables a fine angle of arrival measurement of the received signal. The logic signals on lines $a_0$, $a_1$, $a_2$, $a_3$ are fed to a suitable display, as in FIG. 1, and provide a coarse measurement of the angle of arrival of the received signal. The signals on lines 115, 117, 119 and 120 may be fed to a suitable computer, along with the signals on lines $a_0$, $a_1$, $a_2$ and $a_3$, to provide a fine measurement of the angle of arrival of the received signal.

Having described preferred embodiments of this invention, it is now evident that other embodiments incorporating these concepts may be used. It is felt, therefore, that this invention should not be restricted to the disclosed embodiments, but rather should be limited only by the spirit and scope of the appended claims:

What is claimed is:

1. A radio frequency signal direction finding system comprising:
   (a) a multi-beam antenna having a plurality of feed ports, each one in such feed ports receiving radio frequency energy from a received radio frequency signal, the levels of such energy received at the feed ports being associated with the angle of arrival of the received signal;
   (b) receiver means, coupled to the plurality of feed ports, for producing a plurality of output signals, each one of the plurality of output signals having a level related to the level of radio frequency energy received at a corresponding one of the plurality of feed ports;
   (c) a plurality of high pass filter means, each one fed by a corresponding one of the output signals produced by the receiver means, for differentiating the output signal fed thereto producing a pulse in response to, and having a level related to, a change in level of the output signal fed thereto; and,
   (d) means, responsive to the pulse produced by each one of the plurality of high pass filter means, for determining the angle of arrival of the received signal in accordance with the relative levels of pulses produced by each one of the plurality of high pass filter means.

2. The radio frequency signal direction finding system recited in claim 1 wherein the determining means includes means, responsive to the signals received at the feed ports and the pulses produced by the plurality of filters, for determining the one of the feed ports receiving the largest change in received signal level and the relative levels of the energy received at adjacent feed ports.

3. The radio frequency signal direction finding system recited in claim 1 wherein the determining means includes: Maximum signal means, responsive to the outputs of the plurality of filter means, for producing a signal representative of the largest output produced by the plurality of filter means; and a plurality of gates, each one coupled to a corresponding one of the filter means and each one coupled to the output of the maximum signal means, for enabling the output of a selected one on the plurality of filters to pass through a selected one of the plurality of gates, the output of the selected one of the gates being a signal indicative of the angle of arrival of the received signal.

4. The radio frequency signal direction finding system recited in claim 3 wherein the determining means includes means, responsive to the signals received at the feed ports and the pulses produced by the plurality of filters, for determining the one of the feed ports receiving the largest change in received signal level and the relative levels of the energy received at adjacent feed ports.

5. A radio frequency signal direction finding system comprising:
   (a) a multibeam antenna having a plurality of feed ports, each one of such feed ports receiving energy from a received radio frequency signal, the levels of the energy received at the feed ports being associated with the angle of arrival of the received signal;
   (b) receiver means, coupled to the plurality of feed ports, for producing a plurality of output signals, each one of the plurality of output signals having a level related to the level of radio frequency energy received at a corresponding one of the plurality of feed ports;

(c) a plurality of high pass filter means, each one fed by a corresponding one of the output signals produced by the receiver means, for differentiating the output signal fed thereto producing a pulse in response to, and having a level related to, a change in level of the output signal fed thereto; and, (d) means, responsive to the pulse produced by each one of the plurality of high pass filter means, for determining the angle of arrival of the received signal in accordance with the relative levels of pulses produced by each one of the plurality of high pass filter means.

6. The system recited in claim 5 wherein each one of the high pass filter means includes a capacitor, and wherein such system includes means for discharging such capacitor a predetermined time after the signal is received.

* * * * *

UNITED STATES PATENT OFFICE
CERTIFICATE OF CORRECTION

Patent No. 4,229,740          Dated October 21, 1980

Inventor(s) Nicholas J. Krilanovich

It is certified that error appears in the above-identified patent and that said Letters Patent are hereby corrected as shown below:

Column 3, line 10, delete --24a-26n-- and replace with --24a-24n--;

Column 4, line 42, delete --$T_2$-- and replace with --$t_2$--;

Column 10, line 5, delete --in-- and replace with --of--;

Column 10, line 45, delete --on-- and replace with --of--;

Column 10, line 65 to column 12, line 4 delete:

-- (b) receiver means, coupled to the plurality of feed ports, for producing a plurality of output signals, each one of the plurality of output signals having a level related to the level of radio frequency energy received at a corresponding one of the plurality of feed ports;

UNITED STATES PATENT OFFICE
CERTIFICATE OF CORRECTION

Patent No. 4,229,740    Dated October 21, 1980

Inventor(s) Nicholas J. Krilanovich

It is certified that error appears in the above-identified patent and that said Letters Patent are hereby corrected as shown below:

- (c) a plurality of high pass filter means, each one fed by a corresponding one of the output signals produced by the receiver means, for differentiating the output signal fed thereto producing a pulse in response to, and having a level related to, a change in level of the output signal fed thereto; and,

- (d) means, responsive to the pulse produced by each one of the plurality of high pass filter means, for determining the angle of arrival of the received signal in accordance with the relative levels of pulses produced by each one of the plurality of high pass filter means. -- and replace with:

UNITED STATES PATENT OFFICE
CERTIFICATE OF CORRECTION

Patent No. 4,229,740    Dated  October 21, 1980

Inventor(s)  Nicholas J. Krilanovich

It is certified that error appears in the above-identified patent and that said Letters Patent are hereby corrected as shown below:

--(b) a plurality of receivers, each one being coupled to a corresponding one of the feed ports for producing an output signal having a level related to the level of radio frequency energy received at a corresponding one of the plurality of feed ports;

(c) a plurality of high pass filter means, each one coupled to a corresponding one of the plurality of receivers, each one of such filter means producing a pulse having a magnitude related to the magnitude of a change in the level of the output signal coupled thereto; and (d) means, fed by the plurality of high pass filter means, for producing an output signal representative of the one of the plurality of high pass filter means producing the one of the pulses having the largest magnitude.--

Signed and Sealed this

Twenty-seventh Day of April 1982

|SEAL|

Attest:

GERALD J. MOSSINGHOFF

Attesting Officer    Commissioner of Patents and Trademarks